United States Patent
Mostafa et al.

(10) Patent No.: US 12,026,482 B2
(45) Date of Patent: Jul. 2, 2024

(54) METHODS, SYSTEMS, AND COMPUTER READABLE MEDIA FOR CREATING AND USING MINIMUM DICTIONARY LANGUAGE (MDL) TO ACCESS DATA IN CLOSED-DOMAIN DATA SETS

(71) Applicant: The University of North Carolina at Chapel Hill, Chapel Hill, NC (US)

(72) Inventors: Javed Mostafa, Cary, NC (US); Xiaopeng Lu, Pittsburgh, PA (US); Sandeep Avula, Carrboro, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 25 days.

(21) Appl. No.: 17/633,184

(22) PCT Filed: Dec. 18, 2020

(86) PCT No.: PCT/US2020/066087
§ 371 (c)(1),
(2) Date: Feb. 4, 2022

(87) PCT Pub. No.: WO2021/127488
PCT Pub. Date: Jun. 24, 2021

(65) Prior Publication Data
US 2022/0334808 A1    Oct. 20, 2022

Related U.S. Application Data

(60) Provisional application No. 62/950,069, filed on Dec. 18, 2019.

(51) Int. Cl.
G06F 9/445    (2018.01)
G06F 8/33    (2018.01)
(Continued)

(52) U.S. Cl.
CPC .............. *G06F 8/33* (2013.01); *G06F 40/205* (2020.01); *G06F 40/242* (2020.01)

(58) Field of Classification Search
CPC ........ G06F 8/33; G06F 40/205; G06F 40/242; G06F 40/44; G06F 16/3344;
(Continued)

(56) References Cited

U.S. PATENT DOCUMENTS 7,249,018 B2*   7/2007   Ross ................... G10L 15/1822
                                                704/E15.044
9,947,313 B2*   4/2018   Drewes .................. G10L 15/22
(Continued)

FOREIGN PATENT DOCUMENTS

KR    1018517910000    4/2018

OTHER PUBLICATIONS

Notification of Transmittal of the International Search Report and the Written Opinion of the International Searching Authority, or the Declaration for International Application Serial No. PCT/US2020/066087 (Apr. 14, 2021).

(Continued)

*Primary Examiner* — Thuy Dao
(74) *Attorney, Agent, or Firm* — Jenkins, Taylor & Hunt, P.A.

(57) ABSTRACT

How to correctly understand natural language query and catch the useful information from it is a long-standing research question in the chatbot field. However, in many cases only a small set of words are sufficient for closed-domain tasks. In this paper, we propose Minimal Dictionary Language (MDL): a simple language architecture which allows users to express their needs through certain basic syntax. For the pilot study, we selected Enron email open dataset[2] for our experimental use and apply MDL as the language for email retrieval task. We also built a front-end (Continued)

search interface by Python Flask and Vue.js for test and evaluation purposes.

15 Claims, 7 Drawing Sheets

(51) Int. Cl.
| | |
|---|---|
| *G06F 9/455* | (2018.01) |
| *G06F 40/205* | (2020.01) |
| *G06F 40/242* | (2020.01) |
| *G10L 15/22* | (2006.01) |
| *G10L 25/51* | (2013.01) |

(58) Field of Classification Search
CPC ............ G06F 16/24522; G06F 40/237; G06F 40/216; G06F 16/243; G06F 40/03; G06F 40/42; G10L 15/30; G10L 15/18; G10L 15/22; G09B 7/00; G09B 5/04
See application file for complete search history.

(56) References Cited

U.S. PATENT DOCUMENTS

| | | | | |
|---|---|---|---|---|
| 2003/0056193 | A1* | 3/2003 | Perycz ................... | H04L 67/34 |
| | | | | 717/107 |
| 2016/0012036 | A1* | 1/2016 | Sun ....................... | G06F 40/284 |
| | | | | 704/10 |
| 2017/0132201 | A1* | 5/2017 | Bernelas ................. | G06F 40/30 |
| 2018/0173696 | A1* | 6/2018 | Hosabettu ............... | G06F 16/36 |
| 2020/0073927 | A1* | 3/2020 | Bernelas ................ | G06F 40/211 |

OTHER PUBLICATIONS

Carmel et al., "Rank by Time or by Relevance? Revising Email Search," CIKM'15, pp. 1-11 (Oct. 19-23, 2015).

Elsweiler et al., "What Makes Re-finding Information Difficult? A Study of Email Re-finding," In European Conference on Information Retrieval, pp. 1-12 (2011).

Haas et al., "Toward the Automatic Identification of Sublanguage Vocabulary," Information Processing & Management, vol. 29, No. 6, pp. 721-732 (1993).

Klimt et al., "The Enron Corpus: A New Dataset for Email Classification Research," In European Conference on Machine Learning, pp. 1-11 (2004).

Kuligowska, "Commercial Chatbot: Performance Evaluation, Usability Metrics and Quality Standards of Embodied Conversational Agents," Processionals Center for Business Research, vol. 2, pp. 1-16 (Feb. 2015).

Losee et al., "Sublanguage Terms: Dictionaries, Usage, and Automatic Classification," Journal of the American Society for Information Science, vol. 46, No. 7, pp. 519-529 (1995).

Ramarao et al., "Inlook: Revisiting Email Search Experience," SIGIR'16, pp. 1117-1120 (Jul. 17-21, 2016).

Whittaker et al., "Am I Wasting My Time Organizing Email? A Study of Email Refinding," CHI 2011, Session: Courriel, pp. 1-10 (May 7-12, 2011).

William W. Cohen, Enron Email Dataset. https:/www.cs.cmu.edu/~./ enron/ May 8, 2015.

* cited by examiner

```
┌─────────────────────────────────────────────────────────────────────────┐
│ ○○○  [<][>][□]         [ 167.99.3.1111              ][c]        [−][□] │
├─────────────────────────────────────────────────────────────────────────┤
│                              MDL SEARCH                                 │
│ ?LAST 3 YEAR EMAIL FROM "NANCY"                                         │
│                         [SUBMIT] [RESET]                                │
├─────────────────────────────────────────────────────────────────────────┤
│ FETCHED 15 EMAILS TRY 0.045 s.                                          │
│                                                                         │
│ SFTS CONVERSIONS                                                        │
│                                                                         │
│ DATE: 2002-01-11 14:30:46                                               │
│ FROM: NANCY.BASTIDA@ENRON.COM                                           │
│ FROM_NAME: BASTIDA, NANCY                                               │
│                                                                         │
│ TO: RACHEL.CADY@ENRON.COM                                               │
│ TO_NAME: CADY, RACHEL                                                   │
│                                                                         │
│ RACHEL, ATTACHED IS A SPREADSHEET WITH SFTS CONVERSION INFORMATION AS   │
│ YOU REQUESTED. I SENT FRAZIER AND TEB A NOTE TO ADVISE IF THESE         │
│ CUSTOMERS MUST HAVE CONSECUTIVE RELEASES IN ORDER TO KEEP THEIR FTS-1   │
│ CONTRACTS ACTIVE AND AM AWAITING THEIR FEEDBACK. PLEASE LET ME KNOW IF  │
│ YOU WANT TO SEE THIS IN A DIFFERENT FORMAT OR WITH ADDITIONAL           │
│ INFORMATION. ALSO, I DID NOT FILL IN THE DATE THAT THE FTS-1 CONTRACTS  │
│ REVERT BACK TO SFTS BECAUSE IT ALL DEPENDS ON WHETHER WE LEAVE THE      │
│ CONTRACTS OPEN FOR MONTHLY RELEASES. NB                                 │
├─────────────────────────────────────────────────────────────────────────┤
│ SFTS CONVERSIONS                                                        │
│                                                                         │
│ DATE: 2002-01-11 13:40:41                                               │
└─────────────────────────────────────────────────────────────────────────┘
```

FIG. 6

ON "ERROR"

167.99.3.1111

MDL SEARCH

SUBMIT  RESET

ERROR. NO "?" CATCHED AT THE BEGINNING. PLEASE REFER TO PROJECT WIKI PAGE FOR REFERENCES.

FIG. 7

METHODS, SYSTEMS, AND COMPUTER READABLE MEDIA FOR CREATING AND USING MINIMUM DICTIONARY LANGUAGE (MDL) TO ACCESS DATA IN CLOSED-DOMAIN DATA SETS

PRIORITY CLAIM

This application claims the priority benefit of U.S. Provisional Patent Application Ser. No. 62/950,069, filed Dec. 18, 2020, the disclosure of which is incorporated herein by reference in its entirety.

GOVERNMENT INTEREST

This invention was made with government support under Grant Numbers LM012500 and TR002489 awarded by the National Institutes Of Health. The government has certain rights in the invention.

TECHNICAL FIELD

The subject matter described herein relates to accessing data in closed-domain data sets. More particularly, the subject matter described herein relates to methods, systems, and computer readable media for creating and using minimum dictionary language (MDL) to retrieve data from closed-domain data sets.

BACKGROUND

Many closed-domain data sets contain specific vocabulary that experts use to describe the data. For example, physicians speak in expert terms when describing patient conditions and creating patient medical records. Another area where expert language is used to generate closed-domain data sets is in the field of air traffic control. Still other areas where expert language is used to describe closed-domain data sets are genomics and molecular biology.

When conversing about data in closed-domain data sets, experts use a specific vocabulary rather than using the entire dictionary of the user's native language. It is desirable to generate an automated method for application developers to create applications and access data in closed-domain data sets that enable rapid and accurate access to data.

Accordingly, there exists a need for methods, systems, and computer readable media for creating and using minimum dictionary language (MDL) to access data in closed-domain data sets.

SUMMARY

A method for creating and using a minimal dictionary language to access data in a closed-domain data set includes providing, via an MDL application editor, access to a vocabulary for accessing data in a closed-domain data set. The method further includes receiving, via the MDL application editor, specification of an MDL for accessing data in the closed-domain data set. The method further includes creating, from the MDL specified via the MDL application editor, a domain-specific grammar template for accessing data in the closed-domain data set. The method further includes creating, from the domain-specific grammar template, a domain-specific MDL application for accessing data in the closed-domain data set using the MDL specified via the MDL application editor.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 6 is a computer screen shot of an exemplary user interface of an MDL search system; and FIG. 7 is a computer screen shot illustrating error handling by the MDL search system.

DETAILED DESCRIPTION

Figure 1:
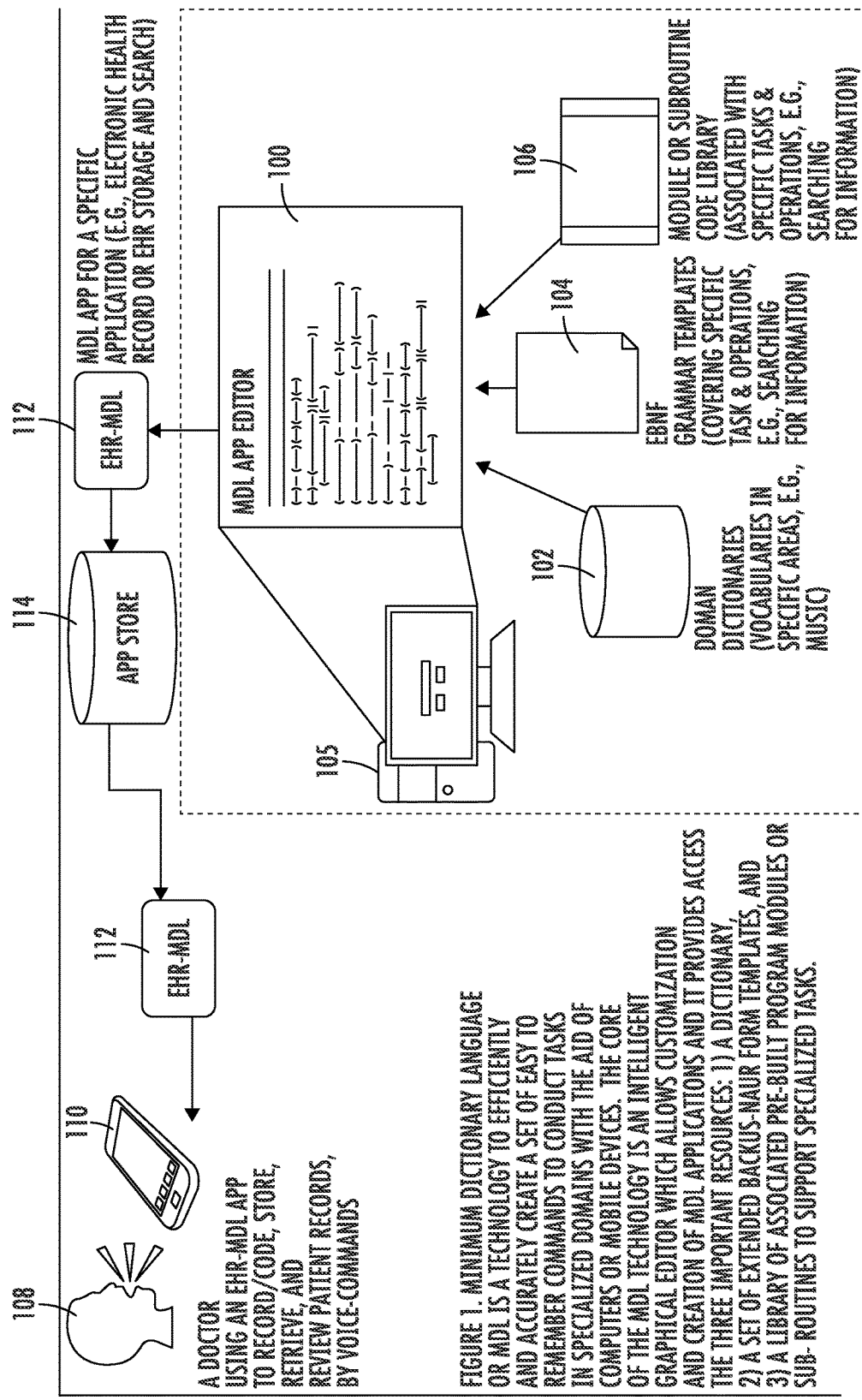
FIG. 1 is a block diagram of a system for creating and using MDL to access data in closed-domain data sets.

The subject matter described herein relates to methods, systems, and computer readable media for creating and using MDL to access data in closed-domain data sets. FIG. 1 is a block diagram illustrating an exemplary system for creating and using MDL for accessing data in closed-domain data sets. Referring to FIG. 1, MDL is a technology for efficiently and accurately creating a set of easy to remember commands to conduct tasks in special domains, referred to herein as closed-domain data sets, with the aid of computers or mobile devices. The core of the MDL technology is an intelligent graphical editor, illustrated in FIG. 1 as MDL application editor 100, which allows the customization and creation of MDL applications for accessing data in closed-domain data sets. MDL application editor 100 provides access to a dictionary 102 containing vocabularies for specific closed-domain data sets, such as music, medicine, engineering, etc. MDL application editor 100 also provides access to a library of customized grammar templates 104 which define commands for accessing the data in the closed-domain data sets using vocabularies specified by the user. MDL application editor 100 may execute on a computing platform 105 including at least one processor and memory. In one example, computing platform 105 may be a server accessible via a computer network for creating customized MDL applications for users of different closed-domain datasets. MDL application editor 100 also provides access to modules or subroutines 106 for performing specific tasks in the closed-domain data sets. Examples of such tasks include searching for information.

In the example illustrated in the FIG. 1, the closed-domain data set is an electronic health record data set that is being accessed by a doctor 108. The application or the app is developed by a developer who may access MDL application editor 100 via smartphone emulator software which mimics the functions of smartphone 110 to create a customized application based on closed domain medical vocabularies and a grammar template for searching electronic health records. The result of creation of the application is an electronic health record MDL application 112 that may be made available to the doctor and to other doctors via an app store interface 114.

Figure 2:
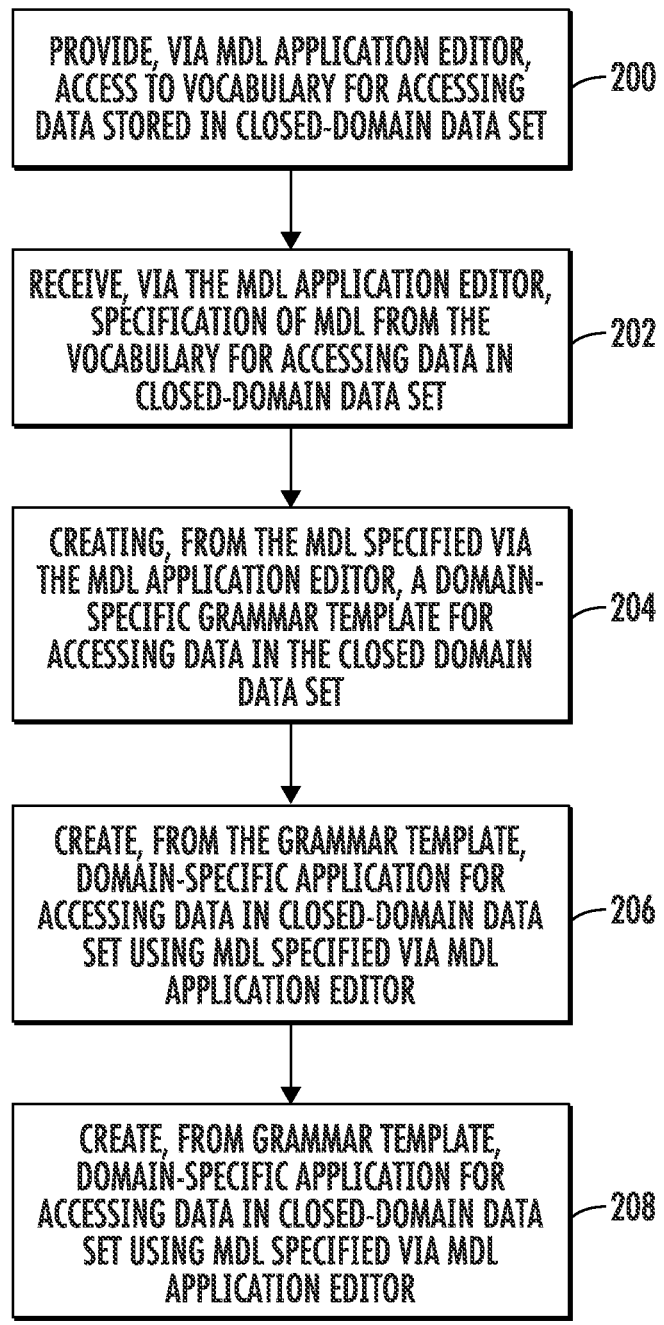
FIG. 2 is a flow chart illustrating an exemplary process for creating and using MDL for accessing data in closed-domain data sets.

FIG. 2 is a flow chart illustrating an exemplary process for creating and using MDL to access closed-domain data sets. Referring to FIG. 2, in step 200, the method includes providing, via an MDL application editor, access to a vocabulary for accessing data in a closed-domain data set. For example, MDL application editor 100 illustrated in FIG. 1 may receive input from an application developer of an identifier or identifiers of a closed-domain data set, access domain dictionary 102 using the identifier or identifiers for the data set input by the application developer, retrieve suggested vocabulary from domain dictionary 102, and thus allowing the application developer to select a customized data set for a user 108 (e.g., a doctor) with familiar but specialized vocabularies to search the closed-domain data set (e.g., electronic medical records). MDL application editor 100 may also enable an application developer to create customized vocabulary words specified by the application developer and not already present in a dictionary for accessing data in the closed-domain data set.

In step 202, the method includes receiving, via the MDL application editor, specification of an MDL for accessing data in the closed-domain data set. Continuing with the example in FIG. 1, an application developer may select or specify a set of domain-specific vocabulary words via application editor 100 for accessing data in the closed-domain data set. The set of domain-specific vocabulary words is referred to a minimum dictionary language.

In step 204, the method includes creating, from the MDL specified by the application developer via the MDL application editor, a domain-specific grammar template for accessing data in the closed-domain data set. For example, grammar templates, such as Extended Backus-Naur Form (EBNF) grammar templates defining commands and for accessing data will be created using the vocabulary words selected by the application developer using MDL application editor 100. As will be described in detail below, the commands may include one set of commands at an operation level and another set of commands at a scope level.

In step 206, the method includes creating, from the grammar template, a domain specific MDL application for accessing data in the closed-domain data set using the MDL specified by the application developer via the MDL application editor. For example, the grammar template created in step 204 may be combined and compiled with one of modules or subroutines 106 to form a domain specific executable MDL application for accessing the data in the closed-domain data set using the vocabulary words specified by the application developer. In FIG. 1, EHR MDL 112 is an example of a domain-specific MDL application for accessing data (searching and/or storing) in electronic health records using an MDL specified by a doctor.

The steps in FIG. 2 may be repeated for different domains so that application developers can create customized MDL applications for accessing data in different closed-domain datasets.

The remainder of this disclosure describes a pilot study where an MDL is created and used to search email data set.

Pilot Study on MDL for Human-Bot Conversation

1. Introduction

Chat bot has been brought into commercial use for decades [7]. However, precisely extracting information and predicting user intention From natural language is still a huge challenge in the field Of human-bot interaction because of the complexity of human language. The information loss during the extraction could make the Chatbot "misunderstand" the intention of the user, thus, return an Inaccurate response.

However, in practice, only a small part of the user's input sentences will be sufficient in the information extraction. In this work, we propose a novel way of human-chatbot architecture: build the Chat bot based on minimal dictionary language (MDL). MDL is a language composed of succinct grammar and specialized vocabulary in a closed-domain, which allows efficient human-chatbot Interaction by limiting the information loss caused by translating between natural language and machine language. In this work, we built an MDL in the closed-domain of email retrieval. We selected Enron email open dataset[2] for our experimental use and the mdl was applied for the email retrieval task. A front-end web interface was also built for test and evaluation purposes.

Section 2 gives a general review of the related literature. At the beginning of the method section, we present the definition of the language (MDL). The rest of the method section explains the procedure of the study and the structure of the system in detail. The primary results and a demonstration is shown in the results section. The last part includes the conclusion and discussion as well as an investigation of the future works.

2. Related Work

Kuligowska proposed a measurement metrics to evaluate the performance of chatbot in her 2015 study on commercial chatbot[7]. She claimed that conversational skills are not a strong point of every commercial chatbot. Some virtual assistants understand small amount of utterances and they try to overcome this issue by invariably Displaying long lists of suggested useful links. However, some users are not likely to click on embedded links[7]. As we suggested above, human language is complex, and the structure of expression is hard to decide. The "misunderstanding" between human and chatbot could be the main cause of invalid conversations. We proposed MDL, which is a closed-domain language designed for information retrieval. The language will be composed of succinct structure that is easy for both human and machine to learn. The idea of MDL extended from sublanguage: the language used in a restricted or specialized domain or field, such as computer science [4]. When specialists in a particular field or discipline communicate Informally, the discipline's sublanguage facilitates their communication by allowing them to be precise in their terminology, and frequently, to be more precise in their terminology[8]. To achieve the goal of conciseness and for the ease of communication, the grammar and the vocabulary of a sublanguage is usually deviate From the general language by omitting unnecessary words and phrases[8]. MDL inherits the characteristics of sublanguage to be succinct and informative.

In our pilot study, an MDL was designed for email retrieval. Despite being an important activity, email search has not seen significant innovation in comparison to web search [9]. Email refinding is an everyday task that sometime can be time-consuming[3]. Some Users sort their emails up into complex folder structures to promote effective refinding. However, these preparatory behaviors are Inefficient and do not improve retrieval success[10]. In contrast, as Whittaker proposed, both search and threading promote more effective findings. Although Steve et. al proposed a rather advanced algorithm, the results were still imprecise by simply searching with unstructured keywords [10]. Also, it is unpleasant to scroll through a long list of results for the most relevant one. David et. al suggested In their 2015 study [1] that it would be more user-friendly to present the result emails by relevance instead of by date. However, it is challenging to decide the "relevance" by searching with unstructured keywords.

Our MDL designed for email retrieval allows users to retrieve the most relevant emails through a simple but precise query. The structure and definition of the language can be found in the next section.

The database we used in our experiment was Enron email open dataset [2], which contained a total of 517,405 messages from 150 users. The raw corpus is current available on the web at http://www-2.cs.cmu.edu/enron/.

3. Methods 3.1 Language Definition

Our formal language definition is expressed using Extended Backus-Naur Form (EBNF). The intuition behind MDL will be first introduced, and the formal definition will be presented at the end of this subsection.

Figure 3:
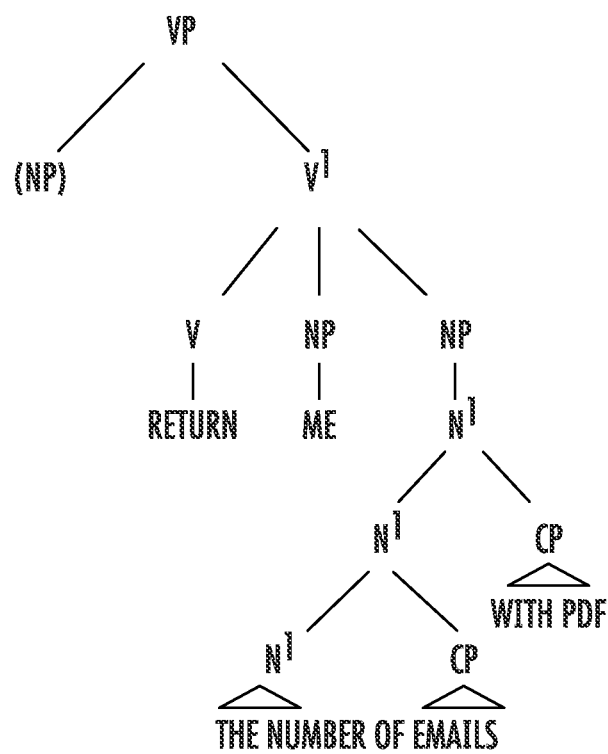
FIG. 3 is a diagram of an x-bar structure of an imperative sentence.

When people try to retrieve information through a visual assistant, a command is usually used (a non-command sentence can of course be used as well, however, it should be able to be transferred into a command. For example, "I want an apple" equals "give me an apple"). As in English, commands can be expressed with imperative sentences. FIG. 3 is an example of a part of the syntax structure of an imperative sentence illustrated by X-bar theory [5]. Since our study focuses on the content of the command, everything above the Verb Phrase (VP) was omitted. In a retrieval task, the intention of a user should be getting desired results through a query. Thus, for example, if the user wants to find how many emails there are with PDF as attachment, it is almost default to choose transitive verbs similar to "return" or "tell" under the Verb(V) which serves as the action; and "me" under the first Noun Phrase (NP) which serves as the first objective. To make our grammar succinct, we only keep the second Noun Phrase (NP) which contains the object we desire and the modifier of the object. The object can be "the number of emails" as shown in the example, or simply "emails". We call this part OPERATION, namely the object that we operate on.

The second important part is the modifier which is composed of a Complementary Phrase (CP) "with PDF". We call this part SCOPE, namely the scope of the object that we care about. Therefore, we designed MDL as a tree structure with OPERATION and SCOPE as the first two branches.

For OPERATION, we structured it through four main aspects: Who (who is the sender), When (the time stamp associated with the origin or the creation of the message), What (the main topic of the message), and How (characteristics of the message, such as frequency, type of data contained, age of the message, language of the message, and importance of the message).

For SCOPE, as MDL serves as a search tool for a personal information bank or collection for messages, we design the SCOPE to be based on two critical structures of messages, namely the container and the content.

Container and content are two scopes that user queries would usually focus on. For example, sometimes the focus of a query would be at the container level (i.e., not necessarily focus on the body of the message but on the labels used to describe the message container). A concrete example is "?'Selim' LAST", meaning to retrieve the last message sent by Selim. Or, the user may request "?'Selim' ALL", which means to retrieve all messages from Selim. Another similar query the user may issue is to retrieve all messages from an organization. For example: "?'IBM' ALL". In this query the focus is not on the content of messages, rather, the focus is on the source of the messages. Therefore, it is a query with the focus on container levels.

A query associated with container could be more complex—the attachment format can also be included. Possible queries are "?TOTAL EMAIL MSWORD": to retrieve all messages that contain MSWORD files; or "?TOTAL EMAIL PDF": to retrieve all messages that contain PDF files. These types of queries are still focused on messages as container, instead of as content.

Content queries are another group of queries that focuses exclusively on what the messages actually are. A typical content query for retrieving all "Mike's" messages on the upcoming "picnic" would be "?'Mike' ON 'picnic'". Also, retrieving the last message on the upcoming "picnic" would be "?ON 'picnic' LAST".

Figure 4:
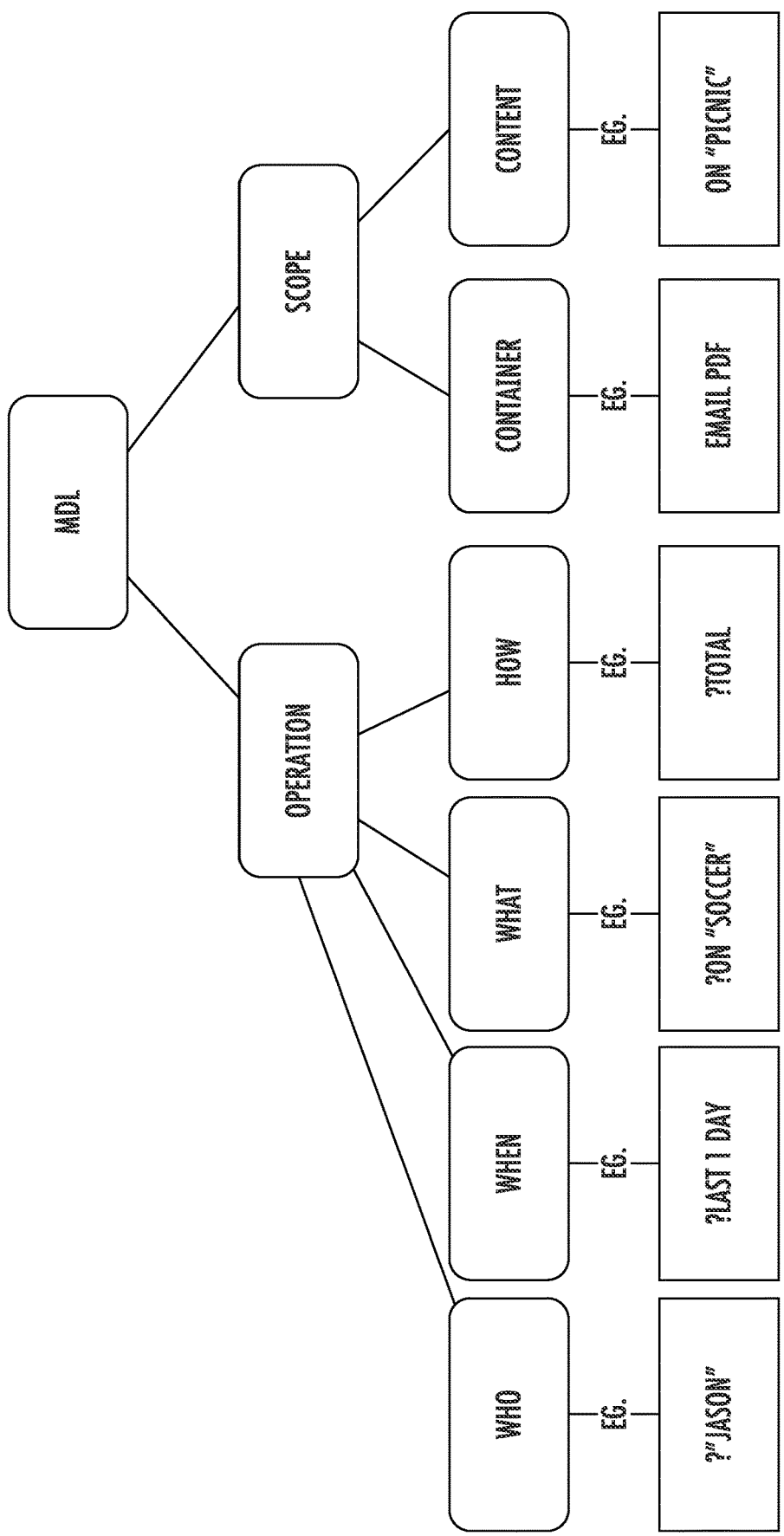
FIG. 4 is a tree diagram of the structure of the minimal dictionary language.

Using the two primary dimensions, namely OPERATION and SCOPE, all MDL queries are created. Therefore, the grammar of the MDL query language can now be described in terms of the two dimensions and some additional details. Our goal is that by using MDL, users may maximize their need through succinct grammar and retrieve information as they desire. The structure of the design of MDL is shown in FIG. 4.

The goal of this project is to develop a certain MDL and to build the corresponding parser for querying personal messages with low learning curve and powerful use cases. Specifically, least keyword commands are implemented so that it is friendly to inexperienced users. Also, as shown above, MDL is clearly structured into SCOPE and OPERATION parts to match user needs in a natural way. While the syntax of MDL for this pilot study is limited to email retrieval behavior and actions, this similar structure and grammar organizations can be easily transferred to other scopes.

MDL follows EBNF (Extended Backus-Naur Form) definition and is formally defined by a set of predefined commands as well as fields that leave to user to fill for different search needs. A "?" is used for the indication of the start of MDL query. Predefined commands at op (OPERATION) level contains 'TOTAL', 'LAST', and 'ON'; predefined commands at the sc (SCOPE) level includes 'EMAIL', 'EMAIL from' and 'EMAIL last'. The user is supposed to give different inputs after these predefined commands for the completion of a MDL query. The formal EBNF definition for MDL is shown below:

Algorithm 1: EBNF Definition for MDL

```
⟨all⟩ ::= ⟨space⟩⟨op⟩⟨space⟩⟨sc⟩
⟨sc⟩ ::= ⟨sc_EMAIL_from⟩ \⟨sc_EMAIL_attach⟩ |
⟨sc_EMAIL_piece⟩ \⟨space⟩
⟨sc_EMAIL_piece⟩ ::= 'EMAIL last'⟨space⟩⟨op_LAST_piece⟩
⟨sc_EMAIL_from⟩ ::= 'EMAIL from'⟨space⟩⟨op_lit_name⟩
⟨sc_EMAIL_attach⟩ ::= 'EMAIL⟨space⟩⟨sc_attach⟩
⟨sc_attach⟩ ::= 'MSWORD' \ 'PDF' \ 'GIF'
⟨op⟩ ::= ⟨op_trig⟩⟨space⟩⟨op_first⟩⟨space⟩
⟨op_first⟩ ::= ⟨op_TOTAL⟩ \⟨op_LAST⟩ \⟨op_lit_ON ⟩ |
⟨op_lit_name⟩
⟨op_lit_ON ⟩ ::= ⟨op_lit_name⟩*⟨op_ON⟩⟨space⟩⟨op_lit_topic⟩
⟨space⟩⟨sc_attach⟩*⟨space⟩⟨op_LAST⟩*
⟨op_lit_topic⟩ ::= ' ⟨chars⟩ '
⟨op_lit_name⟩ ::= (' (⟨chars⟩⟨space⟩)+ '⟨space⟩)+
⟨op_ON⟩ ::= 'ON'
⟨op_LAST⟩ ::= 'LAST' ⟨space⟩ (⟨op_LAST_time⟩ |
⟨op_LAST_piece⟩ )
⟨op_LAST_piece⟩ ::= '[0-9]*'
⟨op_LAST_time⟩ ::= '[0-9]*' ⟨space⟩ '[a-z]+'
⟨op_TOTAL⟩ ::= 'TOTAL'
⟨op_trig⟩ ::= '?'
⟨space⟩ ::= ' '*
⟨chars⟩ ::= '[A-z0-9]*'
```

For implementation, this email-retrieval-specific MDL was written through a bottom-up tree structure. Namely, basic grammar was firstly defined, and the top level grammar was designed through the different combinations of lower components. For the basic grammar, we follow the initial design of SCOPE and OPERATION. We then extend the grammar for different use cases, which cover "Who", "What", "When", and "How". We implemented MDL with Python Parsimonious module.

3.2 Data Preprocessing and Indexing

For experimenting how MDL works and for further usability test, we selected the Enron dataset [6] as our email retrieval test corpus. Enron dataset contains 619,446 emails at the first release. The current version we are able to download contains 517,405 emails from 150 users[2]. All emails are provided as plain text file. After downloading the dataset, we extracted core information (from, from_name to, to_name, date, subject, content) from each email and save it into xml format so that these files could be easily indexed. After xml conversion, we selected Apache Solr as search engine and indexed all emails using modified managed-schema. On top of the original schema, we added one more field type for efficient date field range retrieval and eight fields (including email_id) for indexing all attributes from generated Enron email xml files. All .xml files were indexed and saved into a Solr Core after first round testing with sampled dataset.

Figure 5:
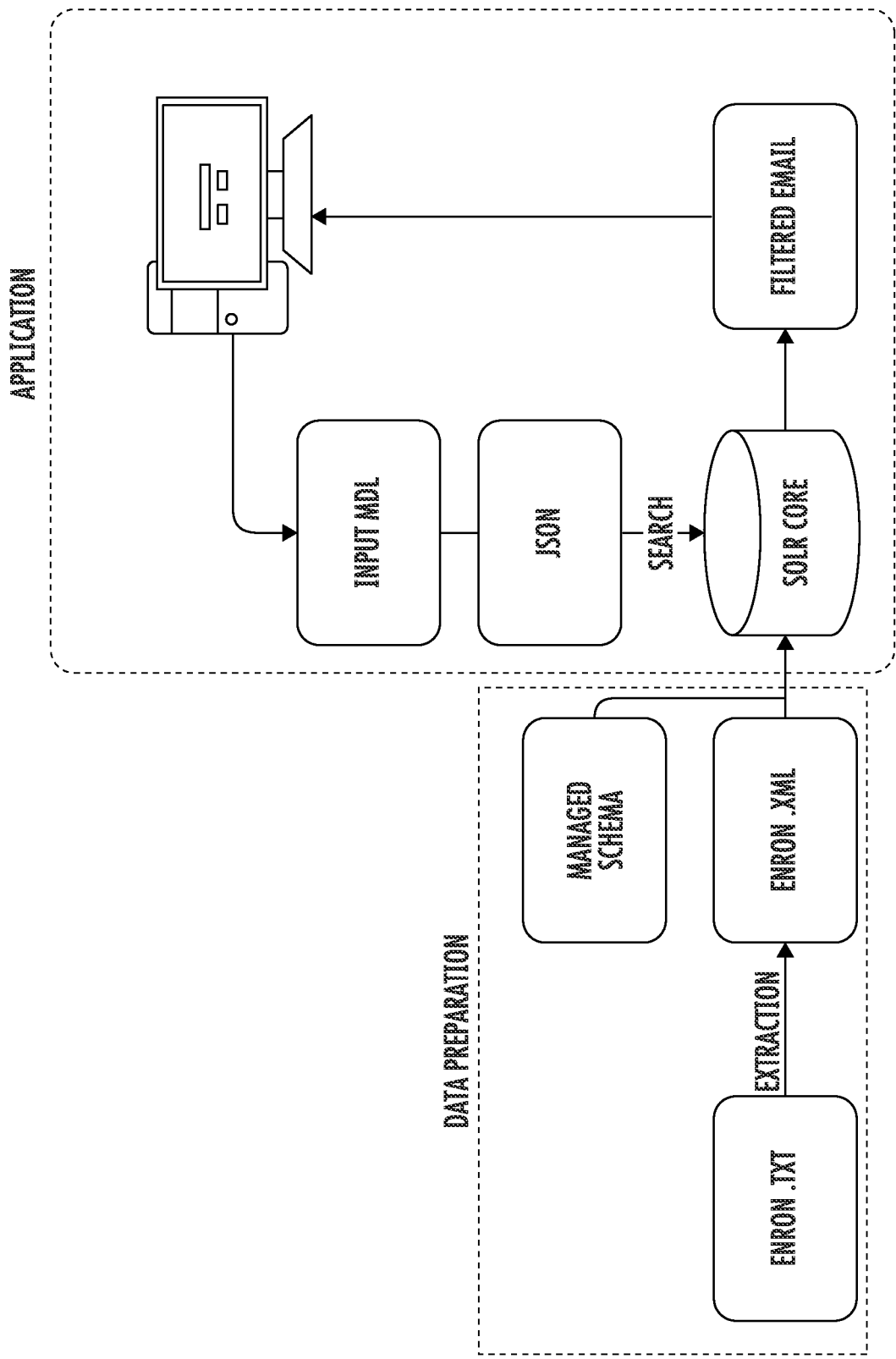
FIG. 5 is block and flow diagram of an MDL system.

Since the goal is to retrieve email results through MDL, we designed the output of MDL to be JSON files so that it can be further converted and fed into Apache Solr for email retrieval. We present our system workflow in the FIG. 5.

4. Results

Because of the large size of the Enron dataset, the study for a subset of Enron dataset was first done on a DigitalOcean server for testing and debugging of both MDL and Apache Solr schema. The full dataset was then indexed, and the service is running on UNC Miksa3 server.

For usability test and system improvement, we built a front-end web interface with Python flask and Vue.js. It is a simple search interface to facilitate testing both the back-end architecture and front-end human-computer interaction.

Whenever user types in a specific query, the query will be sent into back-end error checking module. Specifically, if a syntax error detected, an error message indicating the possible reasons of error will be sent back and alerted at the front page. Then, users can either modify their queries based on the error message or go to project wiki page for more instruction. On the other hand, if no error is detected, this MDL query will be parsed to JSON based on our EBNF grammar. The Apache Solr API will then be called for the search result based on both the parsed query and the indexed files in the Solr Core. At last, the retrieved result will undergo another check at the front-end. If retrieved results are valid xml files with complete fields, these results will be parsed back into readable format and displayed in the front page. Since for email retrieval task, email might be still useful even if one or two fields are missing. We put malformed xml files into another lenient parser, and the results will still present to the front page with some missing fields.

FIG. 6 is an example of web interface we created for MDL. By typing MDL query into text box, both summary statistics and all emails retrieved based on MDL query will be displayed to the user. The example query is "'?LAST 3 year EMAIL from 'nancy'". As shown in FIG. 6, 15 emails matching these criteria were found by 0.045 s. By scrolling down the page, the user can check all these emails sorted by time. Note that the time field here does not have to be "3 year". User can also choose "day" or "month" as date range and the system will catch these keywords as well. After one searching action ends, the user can click on "Reset" button to clear the input and do another search.

Though MDL is tolerant to flexible input style (single quote/double quote; uppercase/lowercase), its original grammar should still be followed during the search. In order to help users get familiar with MDL grammar as well as help users debug their input query, we included comprehensive error handling to catch unexpected query input. For example, as shown in FIG. 7, if user forgot to put "?" in front of the query, error message will show in the page and prompt user to go to the reference page where all MDL commands and structures are listed. In this way, users can recheck how their needs can be fulfilled by correct MDL commands and then revise their own queries for another search.

5. Discussion and Future Work

The MDL system would perfectly fit for the cases where users request certain information from a closed-domain. It serves as a reliable tool to fill the gap between the human needs and the current chat-bot design, which leads to significant efficiency boost.

The MDL system still has a large room for improvement. First of all, the MDL search interface could be more functional by adding features such as sorting and grammar snippet for a better search experience. Also, we desire to further our research by doing usability analysis for how exactly this system would help to improve retrieval efficiency.

Most importantly, the pilot study focuses on email retrieval with open dataset. At the next stage, we plan to broaden both the scope of the use cases and the platforms of utilizing MDL system to bring this prototype system to the real world.

The MDL system can be adjusted and applied to many platforms. As the goal of the whole research project is to simplify the complex interaction between chatbot and human, the full MDL system will be integrated with automatic speech recognition (ASR) at mobile platform for our conversational chatbot in the near future.

The disclosure of each of the following references is incorporated herein by reference in its entirety.

REFERENCES

[1] David Carmel, Guy Halawi, Liane Lewin-Eytan, Yoelle Maarek, and Ariel Raviv 2015. Rank by time or by relevance?: Revisiting email search. In Proceedings of the 24th ACM International on Conference on Information and Knowledge Management. ACM, 283-292.
[2] William W. Cohen. 2015. Enron Email Dataset. https://www.cs.cmu.edu/~./enron/[3]
[3] David Elsweiler, Mark Baillie, and Ian Ruthven. 2011. What makes re-finding information difficult? a study of email re-finding. In European Conference on Information Retrieval. Springer, 568-579.
[4] Stephanie W Haas and Shaoyi He. 1993. Toward the automatic identification of sublanguage vocabulary. Information Processing & Management 29, 6 (1993), 721-732.
[5] Ray Jackendoff. 1977. X syntax: A study of phrase structure. Linguistic Inquiry Monographs Cambridge, Mass. 2 (1977), 1-249.
[6] Bryan Klimt and Yiming Yang. 2004. The enron corpus: A new dataset for email classification research. In European Conference on Machine Learning. Springer, 217-226.
[7] Karolina Kuligowska. 2015. Commercial chatbot: performance evaluation, usability metrics and quality standards of embodied conversational agents. (2015).
[8] Robert M Losee and Stephanie W Haas. 1995. Sublanguage terms: Dictionaries, usage, and automatic classification. Journal of the American Society for Information Science 46, 7 (1995), 519-529.
[9] Pranav Ramarao, Suresh Iyengar, Pushkar Chitnis, Raghavendra Udupa, and Balasubramanyan Ashok. 2016. Inlook: Revisiting email search experience. In Proceedings of the 39th International ACM SIGIR conference on Research and Development in Information Retrieval. ACM, 1117-1120.
[10] Steve Whittaker, Tara Matthews, Julian Cerruti, Hernan Badenes, and John Tang 2011. Am I wasting my time organizing email?: a study of email refinding. In Proceedings of the SIGCHI Conference on Human Factors in Computing Systems ACM, 3449-3458.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for using a minimal dictionary language (MDL) to access data in a closed-domain data set, the method comprising:
   providing, via a minimal dictionary language (MDL) application editor, access to a vocabulary for accessing data in a closed-domain data set;
   receiving, via the MDL application editor, specification of an MDL for accessing data in the closed-domain data set;
   creating, from the MDL, a domain-specific grammar template for accessing data in the closed-domain data set, wherein creating the domain-specific grammar template includes creating the domain-specific grammar template in an Extended Backus-Naur Form (EBNF) format; and
   creating, from the domain-specific grammar template, a domain-specific MDL application for accessing data in the closed-domain data set using the MDL, wherein creating the domain-specific MDL application includes combining the EBNF-formatted grammar template with a module or subroutine for performing a task associated with the closed-domain data set and compiling the combination.

2. The method of claim 1 wherein providing access to the vocabulary includes accessing a domain dictionary using domain identification information specified via the MDL application editor to identify the closed-domain data set and retrieving the vocabulary from the domain dictionary.

3. The method of claim 2 wherein receiving the specification of the MDL includes receiving a selection of vocabulary words extracted from the domain dictionary.

4. The method of claim 2 wherein receiving the specification of the MDL includes allowing an application developer to specify vocabulary words that are not stored as suggested vocabulary words in the domain dictionary.

5. The method of claim 1 wherein the domain-specific grammar template includes commands specified at an operation level and commands specified at a scope level.

6. The method of claim 1 wherein the domain-specific MDL application receives input from a user for accessing the data in the closed-domain dataset and uses the domain-specific grammar template for parsing the input from the user, retrieving data from the closed-domain data set, and providing the data retrieved from the closed-domain data set to the user.

7. The method of claim 1 comprising indexing the data in the closed-domain data set using the MDL.

8. A system for using a minimal dictionary language (MDL) to access data in a closed-domain data set, the system comprising:
   a computing platform including at least one processor and a memory
   a minimal dictionary language (MDL) application editor executable by the at least one processor for providing, access to a vocabulary for accessing data in a closed-domain data set, specification of an MDL for accessing data in the closed-domain data set, creating, from the MDL, a domain-specific grammar template for accessing data in the closed-domain data set, wherein creating the domain-specific grammar template includes creating the domain-specific grammar template in an Extended Backus-Naur Form (EBNF) format, and creating, from the domain-specific grammar template, a domain-specific MDL application for accessing data in the closed-domain data set using the MDL, wherein creating the domain-specific MDL application includes combining the EBNF-formatted grammar template with a module or subroutine for performing a task associated with the closed-domain data set and compiling the combination.

9. The system of claim 8 wherein providing access to the vocabulary includes accessing a domain dictionary using domain identification information specified via the MDL application editor to identify the closed-domain data set and retrieving the vocabulary from the domain dictionary.

10. The system of claim 9 wherein receiving the specification of the MDL includes receiving a selection of vocabulary words extracted from the domain dictionary.

11. The system of claim 9 wherein receiving the specification of the MDL includes allowing an application developer to specify vocabulary words that are not stored as suggested vocabulary words in the domain dictionary.

12. The system of claim 8 wherein the domain-specific grammar template includes commands specified at an operation level and commands specified at a scope level.

13. The system of claim 8 wherein the domain-specific MDL application receives input from a user for accessing the data in the closed-domain dataset and uses the domain-specific grammar template for parsing the input from the user, retrieving data from the closed-domain data set, and Providing the data retrieved from the closed-domain data set to the user.

14. The system of claim 7 comprising an indexer for indexing the data in the closed-domain data set using the MDL.

15. A non-transitory computer readable medium having stored thereon executable instructions that when executed by a processor of a computer control the computer to perform steps comprising:
  providing, via a minimum dictionary language (MDL) application editor, access to a vocabulary for accessing data in a closed-domain data set;
  receiving, via the MDL application editor, specification of an MDL for accessing data in the closed-domain data set;
  creating, from the MDL, a domain-specific grammar template for accessing data in the closed-domain data set, wherein creating the domain-specific grammar template includes creating the domain-specific grammar template in an Extended Backus-Naur Form (EBNF) format; and
  creating, from the domain-specific grammar template, a domain-specific MDL application for accessing data in the closed-domain data set using the MDL, wherein creating the domain-specific MDL application includes combining the EBNF-formatted grammar template with a module or subroutine for performing a task associated with the closed-domain data set and compiling the combination.

\* \* \* \* \*